United States Patent
Cohen et al.

(10) Patent No.: US 12,265,794 B2
(45) Date of Patent: *Apr. 1, 2025

(54) METHODS AND SYSTEMS FOR GENERATING PROBLEM DESCRIPTION

(71) Applicant: INTUIT INC., Mountain View, CA (US)

(72) Inventors: Rami Cohen, Tel Aviv (IL); Noa Haas, Mountain View, CA (US); Oren Sar Shalom, Mountain View, CA (US); Alexander Zhicharevich, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,783

(22) Filed: Oct. 6, 2023

(65) Prior Publication Data

US 2024/0037342 A1    Feb. 1, 2024

Related U.S. Application Data

(63) Continuation of application No. 18/180,089, filed on Mar. 7, 2023, now Pat. No. 11,822,891, which is a continuation of application No. 17/242,231, filed on Apr. 27, 2021, now Pat. No. 11,625,541.

(51) Int. Cl.
| | |
|---|---|
| *G06F 40/30* | (2020.01) |
| *G06N 20/20* | (2019.01) |
| *G10L 15/26* | (2006.01) |
| *H04M 3/51* | (2006.01) |

(52) U.S. Cl.
CPC ............ *G06F 40/30* (2020.01); *G06N 20/20* (2019.01); *G10L 15/26* (2013.01); *H04M 3/5175* (2013.01)

(58) Field of Classification Search
None
See application file for complete search history.

(56) References Cited

U.S. PATENT DOCUMENTS

| | | | | |
|---|---|---|---|---|
| 8,626,509 | B2* | 1/2014 | Roy | G10L 15/26 |
| | | | | 707/777 |
| 9,232,063 | B2* | 1/2016 | Romano | H04M 3/2218 |
| 10,666,792 | B1* | 5/2020 | Marzuoli | H04M 3/436 |
| 2006/0233325 | A1* | 10/2006 | Wu | G06F 40/242 |
| | | | | 704/E15.045 |
| 2018/0096617 | A1* | 4/2018 | Tapuhi | G06Q 10/0639 |
| 2020/0065334 | A1* | 2/2020 | Rodriguez | G06F 40/35 |
| 2021/0390127 | A1* | 12/2021 | Fox | G06F 16/335 |
| 2022/0253472 | A1* | 8/2022 | Oberoi | G06F 16/31 |

* cited by examiner

*Primary Examiner* — Nafiz E Hoque
(74) *Attorney, Agent, or Firm* — DLA PIPER LLP US

(57) ABSTRACT

A computing system identifies an incoming voice call from a user device to an agent device associated with the computing system. The computing system generates a transcription of the incoming voice call using one or more natural language processing techniques. The computing system extracts a problem description from the transcription. The problem description indicates a topic for the incoming voice call. A first machine learning model estimates a situation vector from the problem description. A second machine learning model identifies a pre-existing situation vector that closely matches the estimated situation vector. The computing system retrieves a situation description that corresponds to the identified pre-existing situation vector.

15 Claims, 9 Drawing Sheets

METHODS AND SYSTEMS FOR GENERATING PROBLEM DESCRIPTION

CROSS-REFERENCE TO RELATED APPLICATION

This application is a continuation of U.S. application Ser. No. 18/180,089, filed Mar. 7, 2023, which is a continuation of U.S. application Ser. No. 17/242,231, filed Apr. 27, 2021, now U.S. Pat. No. 11,625,541, issued Apr. 11, 2023. The contents of each application are incorporated herein by reference in their entirety.

BACKGROUND

While communication between customers and service providers frequently takes place online, there remains an ongoing need for voice communications between an agent of the service provider and a customer. An agent typically is a member of a service provider's call center, in which the task of the agent is to make or answer telephone calls. A call center agent may have the responsibility to take customer service calls from users of a service provider's data management system, to provide technical support for problems related to a data management system, and various other agent responsibilities.

Such calls between agents and customers are often recorded. Such call recordings are typically used for quality control purposes and may be referenced to help solve future customer issues. Customer situations are usually one or more sentences long. Since the breadth of situations customers face is somewhat limited, the majority of customer situations tend to repeat. Because each agent describes a customer's situation in a different style and wording, it becomes difficult to group similar situations together.

DETAILED DESCRIPTION OF SEVERAL EMBODIMENTS

The described system and method include one or more techniques for automatically generating portions of a call log for a customer service agent. A computing system identifies an incoming voice call from a user device to an agent device associated with the computing system. The computing system generates a transcription of the incoming voice call using one or more natural language processing techniques. The computing system extracts a problem description from the transcription. The problem description indicates a topic for the incoming voice call. A first machine learning model estimates a situation vector from the problem description. A second machine learning model identifies a pre-existing situation vector that closely matches the estimated situation vector. The computing system retrieves a situation description that corresponds to the identified pre-existing situation vector.

Figure 1:
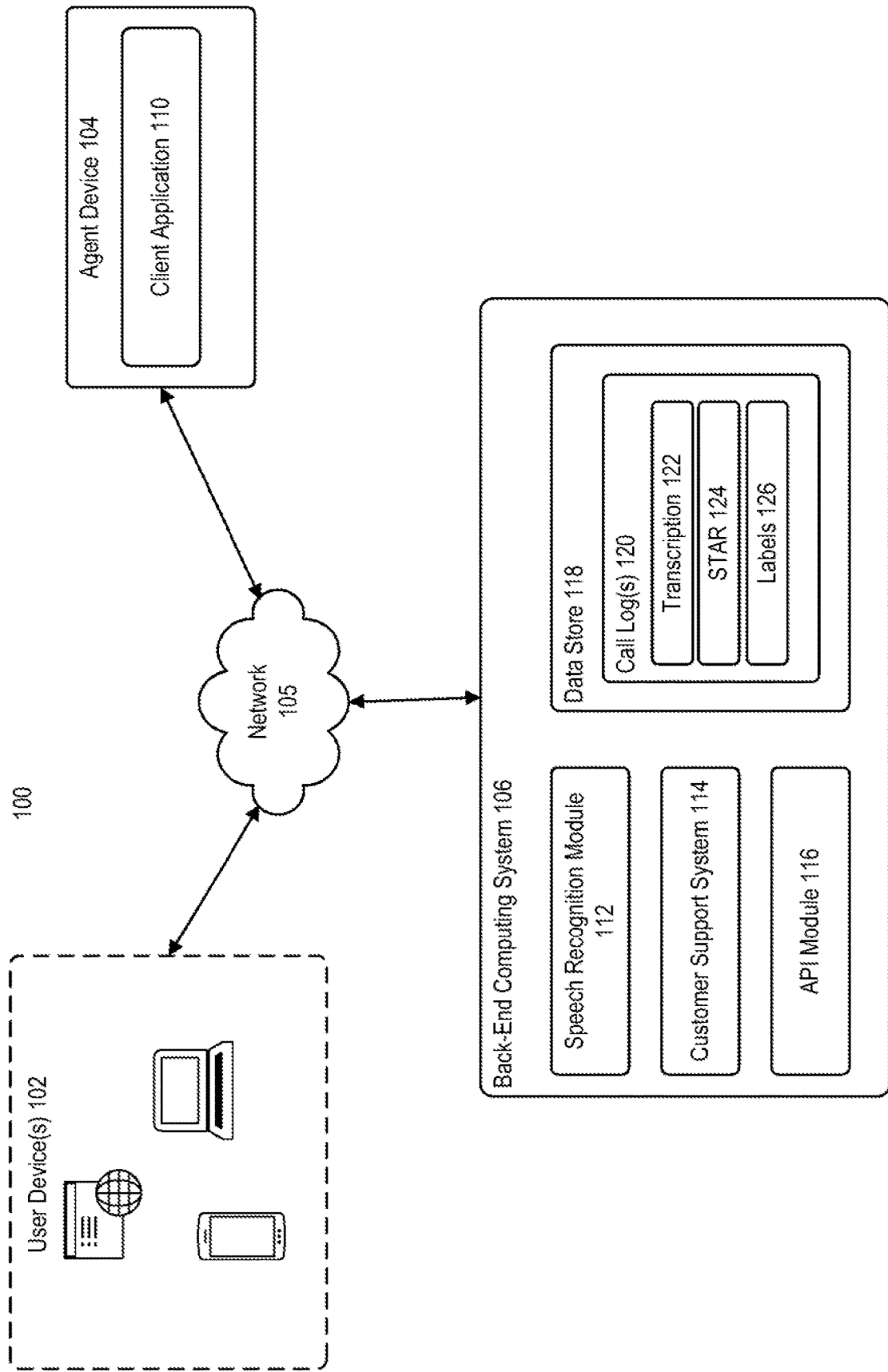
FIG. 1 shows an example computing environment, according to various embodiments of the present disclosure.

FIG. 1 shows an example computing environment 100, according to embodiments of the present disclosure. Computing environment 100 may include one or more user devices 102, one or more agent devices 104, and a back-end computing system 106. One or more user devices 102, one or more agent devices 104, and back-end computing system 106 may be configured to communicate through network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

For example, network 105 may be the Internet, a private data network, virtual private network using a public network and/or other suitable connection(s) that enables components in computing environment 100 to send and receive information between the components of computing environment 100.

In some embodiments, communication between the elements may be facilitated by one or more application programming interfaces (APIs). APIs of back-end computing system 106 may be proprietary and/or may be examples available to those of ordinary skill in the art such as Amazon® Web Services (AWS) APIs or the like User device 102 may be operated by a user. User device 102 may be representative of a mobile device, a tablet, a desktop computer, or any computing system having the capabilities described herein. Users may include, but are not limited to, individuals such as, for example, subscribers, clients, prospective clients, or customers of an entity associated with back-end computing system 106, such as individuals who have obtained, will obtain, or may obtain a product, service, or consultation from an entity associated with back-end computing system 106. User device 102 may be in communication with agent device 104 via network 105. For example, user device 102 may contact agent device 104 when a user associated with user device 102 has a customer service issue.

Agent device 104 may be operated by an agent associated with back-end computing system 106. Agent device 104 may be representative of a mobile device, a tablet, a desktop computer, or any computing system having the capabilities described herein. Agent device 104 may include at least client application 110. Application 110 may be representative a stand-alone application associated with back-end computing system 106. Application 110 may facilitate agent communication with customers or users associated with one or more user devices 102. For example, via application 110, an agent may be able to document communications with a user.

Conventionally, summaries by agents may be written in a situation-trouble-action-resolution (STAR) structure. The STAR structure may allow the reading agent to easily understand the details of a previous call. The creation of case notes, however, is a time consuming, manual process, which also requires the agent's attention during the call. Application 110 eliminates this time consuming and manual process by automatically producing the situation (S) part from a transcript of a call. To do so, application 110 may access functionality of back-end computing system 106.

Back-end computing system 106 may be configured to communicate with one or more agent devices 104. As shown, back-end computing system 106 may include a speech recognition module 112, a customer support system 114, an application programming interface (API) module 116, and a data store 118. Each of speech recognition module 112, customer support system 114, and API module 116 may be comprised of one or more software modules. The one or more software modules may be collections of code or instructions stored on a media (e.g., memory of back-end computing system 106) that represent a series of machine instructions (e.g., program code) that implements one or more algorithmic steps. Such machine instructions may be the actual computer code the processor of back-end computing system 106 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Customer support system 114 may be configured to support agents during customer support calls with user device 102. In some embodiments, customer support system 114 may be invoked upon agent device 104 establishing a communication session with user device 102. For example, agent device 104 may invoke customer support system 114, via application 110, for inputting notes associated with a customer service call. In some embodiments, customer support system 114 may be configured to record conversations between user devices 102 and agent devices 104. Using the recordings, customer support system 114 may be configured to automatically generate portions of the case-note for agent device 104. For example, customer support system 114 may be configured to automatically generate a situation description for agent device 104 for a target customer service call.

Speech recognition module 112 may be configured to generate transcripts of a customer service call from the recordings generated by customer support system 114. For example, speech recognition module 112 may apply one or more natural language processing techniques to the recordings in order to generate a transcription of the conversation. Customer support system 114 may utilize the transcription in order to automatically generate portions of the case-note for agent device 104.

In some embodiments, rather than utilize an internal natural language processing module, such as speech recognition module 112, back-end computing system 106 may instead utilize API module 116. For example, API module 116 may call one or more external services that may be configured to generate a transcript of a customer service call from the recordings generated by customer support system 114. Customer support system 114 may utilize the transcription to automatically generate portions of the case-note for agent device 104.

Data store 118 may be configured to store call logs 120 associated with customer calls from user devices 102 to agent devices 104. Each call log 120 may include a transcription 122, a STAR structure 124, and one or more labels 126. Each STAR structure 124 may be associated with one or more labels 126. For example, each case-note may be labeled with a category and a subcategory, depending on the user's reason for calling agent device 104. In some embodiments, an example category may be banking. For the category of banking, there may be a plurality of subcategories, such as, but not limited to, reconcile, bank transactions, bank transfer, and the like. In some embodiments, an example category may be login issues. For the category of login issues, there may be a plurality of subcategories, such as, but not limited to, password reset, lockout, single sign-on (SSO) login, and the like. In some embodiments, an example category may be billing. For the category of billing, there may be a plurality of subcategories, such as, but not limited to, billing update, billing discounts, charge or fee inquiry, and the like.

Figure 2:
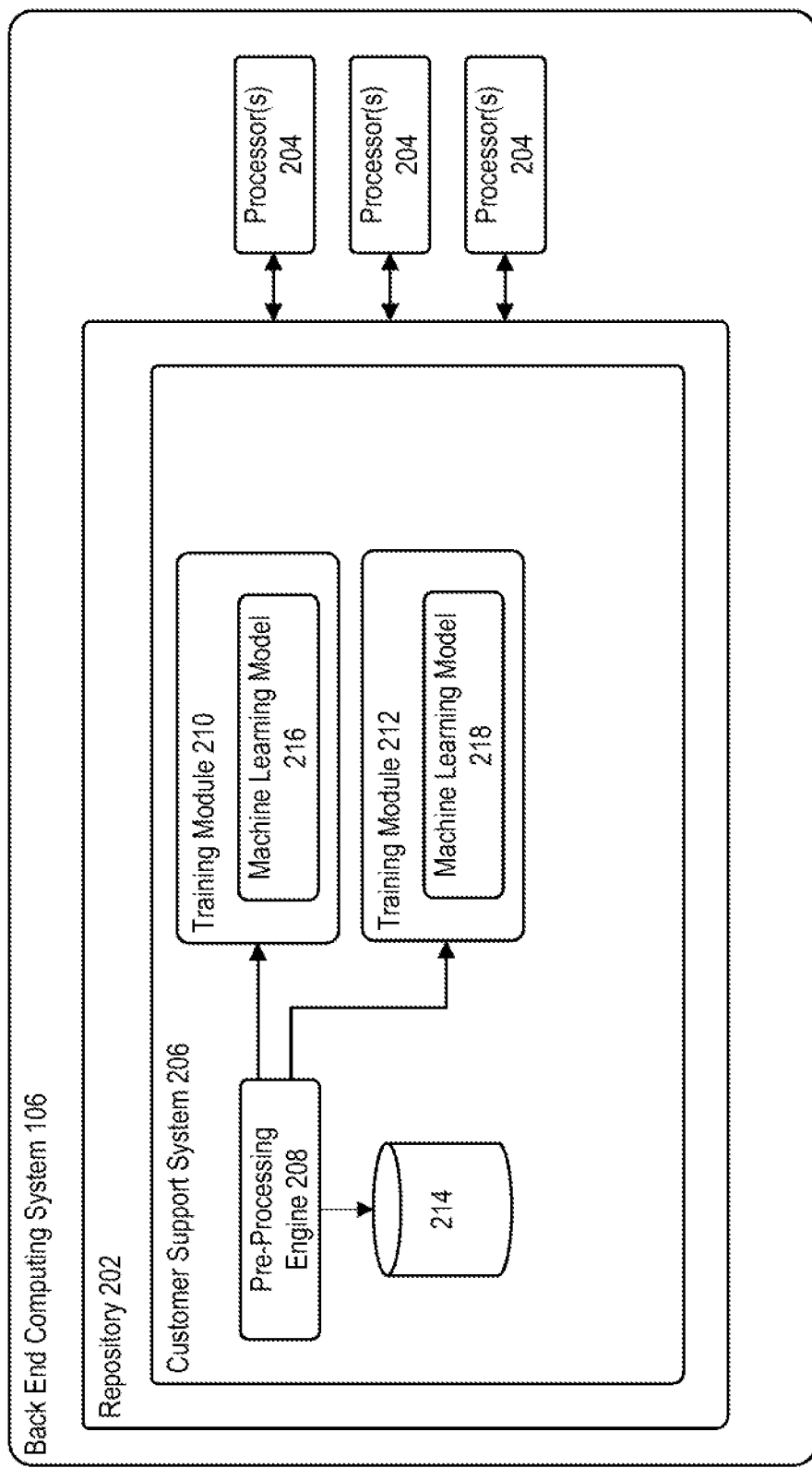
FIG. 2 is a block diagram illustrating a back-end computing system, according various embodiments of the present disclosure.

FIG. 2 is a block diagram illustrating back-end computing system 106, according to one or more embodiments disclosed herein. As shown, back-end computing system 106 may include a repository 202 and one or more computer processors 204. In some embodiments, back-end computing system 106 may take the form of the computing device 800 described in FIG. 8 and the accompanying description below. In one or more embodiments, one or more computer processors 204 may take the form of computer processor(s) 802 described in FIG. 8 and the accompanying description below.

In some embodiments, repository 202 may be any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. Repository 202 may include customer support system 206.

Customer support system 206 may be configured to train and deploy a machine learning model configured to automatically generate a situation description for a STAR structure that would otherwise be generated by agent device 104. Customer support system 206 may include a pre-processing engine 208 and a training module 210. Each of pre-processing engine 208 and training module 210 may be comprised of one or more software modules. The one or more software modules may be collections of code or instructions stored on a media (e.g., memory of back-end computing system 106) that represent a series of machine instructions (e.g., program code) that implements one or more algorithmic steps. Such machine instructions may be the actual computer code the processor of back-end computing system 106 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Pre-processing engine 208 is configured to generate one or more first training data sets for training module 210. To generate the one or more first training data set, pre-processing engine 208 may access database 214. Database 214 may store previously generated case-notes for customer calls. In some embodiments, pre-processing engine 208 may access previously generated case-notes for customers calls for a specific product (e.g., Quickbooks, TurboTax, Mint, etc.). For example, pre-processing engine 208 may generate a first training data set for product A, a second training data set for product B, and an nth training set for product N. In some embodiments, pre-processing engine 208 may generate one or more first training data sets, generically, without regard to a specific process.

As described above, each case-note may be stored in the STAR structure. In some embodiments, pre-processing engine 208 may utilize one or more algorithms to extract the situation (S) portions for each case note from each respective STAR structure. In this manner, pre-processing engine 208 may generate a "situation corpus" as the one or more first training data set. In some embodiments, each situation description in the situation corpus may include one or more labels associated therewith. For example, each case-note may be labeled to a category and a subcategory, depending on the user's reason for calling agent device 104.

In some embodiments, pre-processing engine 208 may perform one or more pre-processing operations to the situation corpus. Because different agents may write in different styles, pre-processing engine 208 may be configured to standardize the situation corpus. Accordingly, pre-processing engine 208 may filter the situation corpus to contain situation descriptions that satisfy a specific format. For example, pre-processing engine 208 may identify a subset of situation descriptions that are longer than X characters and shorter than Y characters (e.g., longer than 40 characters and shorter than 100 characters).

In some embodiments, pre-processing engine 208 may further filter the situation descriptions to include those situation descriptions that start with the same word or characters. For example, pre-processing engine 208 may further filter the situation descriptions to include those situation descriptions that start with the word "customer" or characters "cx" (i.e., shorthand for customers).

In some embodiments, pre-processing engine 208 further filters the situation descriptions such that the situation descriptions in the training data set have the same or similar meanings. Accordingly, pre-processing engine 208 may be configured to generalize the situation descriptions by replacing references to a specific customer with an appropriate placeholder. For example, pre-processing engine 208 may utilize a name entity recognition algorithm to identify tokens in the situation description that may refer to a customer's name (e.g., "David" or "she") and replace them with a special token (e.g., "CX_NAME").

Training module 210 is configured to train machine learning model 216 to map a situation description to a vector space, such that semantically similar situation descriptions are close. In some embodiments, training module 210 may train machine learning model 216 to generate a vector representation for each situation description in the one or more first training data sets. In this manner, situations that may be similar in nature may result in similar vectors.

In some embodiments, machine learning model 216 is representative of a Siamese multi-task bidirectional encoder representations from transformers (SBERT) model. To train machine learning model 216, training module 210 may select pairs of situation descriptions from the training data set for input to machine learning model 216. Machine learning model 216 may be trained to encode each situation description into a respective vector representation. Training module 210 may then train machine learning model 216 to compute a similarity score between the two vectors.

As those skilled in the art understand, it is easy for a machine learning model 216 to determine if two situation descriptions are different if the situation descriptions are chosen at random. To account for this, training module 210 fine tunes machine learning model 216 by carefully selecting pairs of sentences for input to machine learning model 216. For example, training module 210 may leverage the labels of each situation description to form situation description pairs from the same category, but different subcategories. Machine learning model 216 may then compute a similarity score between the vectors. In this manner, training module 210 may increase the accuracy of machine learning model 216 by training machine learning model 216 to differentiate between two very similar situation descriptions.

Training module 212 is configured to train machine learning model 218 to estimate a situation vector from a corresponding transcription. Pre-processing engine 208 is configured to generate one or more second training data sets for training module 212. To generate the one or more second training data sets, pre-processing engine 208 may access database 214. Database 214 may store previously generated transcriptions for previously generated case-notes. In some embodiments, pre-processing engine 208 may access previously generated case-notes for customers calls for a specific product (e.g., Quickbooks, TurboTax, Mint, etc.). For example, pre-processing engine 208 may generate a first training data set for product A, a second training data set for product B, and an nth training set for product N. In some embodiments, pre-processing engine 208 may generate one or more second training data sets, generically, without regard to a specific process.

Continuing with the above, in some embodiments, training module 212 identifies the transcripts corresponding to the situation vectors that may be generated by machine learning model 216 once fully trained. In this manner, training module 212 may generate a training set that includes a set of situation vectors (as generated by machine learning model 216) and a corresponding set of transcriptions.

For each transcription, pre-processing engine 208 is configured to apply one or more algorithms to extract a problem description portion from each transcription. In this manner, pre-processing engine 208 generates a problem description corpus for training machine learning model 218.

In some embodiments, pre-processing engine 208 performs one or more pre-processing operations to the problem description corpus. Because different agents may write in different styles, pre-processing engine 208 may be configured to standardize the problem description corpus. Accordingly, pre-processing engine 208 may filter the problem description corpus to contain situation descriptions that satisfy a specific format. For example, pre-processing engine 208 may identify a subset of problem descriptions that are longer than X characters and shorter than Y characters (e.g., longer than 40 characters and shorter than 100 characters).

In some embodiments, pre-processing engine 208 further filters the problem description corpus to include those problem descriptions that start with the same word or characters. For example, pre-processing engine 208 may further filter the problem descriptions to include those problem descriptions that start with the word "customer" or characters "cx" (i.e., shorthand for customers).

In some embodiments, pre-processing engine 208 further filters the problem descriptions such that the situation descriptions in the training data set have the same or similar meanings. Accordingly, pre-processing engine 208 may be configured to generalize the problem descriptions by replacing references to a specific customer with an appropriate placeholder. For example, pre-processing engine 208 may utilize a name entity recognition algorithm to identify tokens in the problem description that may refer to a customer's name (e.g., "David" or "she") and replace them with a special token (e.g., "CX_NAME").

Training module 210 uses the problem description training data set to train machine learning model 218 to estimate a situation vector based on the problem description. In some embodiments, training module 210 trains machine learning model 216 to estimate a vector representation for each problem description in the training data set.

In some embodiments, machine learning model 218 is representative of a BERT model. To train machine learning model 218, training module 210 may select problem description from the problem description training data set and a corresponding situation vector for input to machine learning model 218. Machine learning model 218 may be trained to encode each problem description into a respective vector representation. Training module 210 may then train machine learning model 218 to compute a similarity score between the problem description vector and the associated situation vector. If this similarity score is close (e.g., 1), then machine learning model 218 generated a vector that is closely similar to the corresponding situation vector. In this manner, machine learning model 218 may be trained to generate the situation vector directly from the transcription, thus eliminating any manual process to be performed by the agent.

Figure 3A:
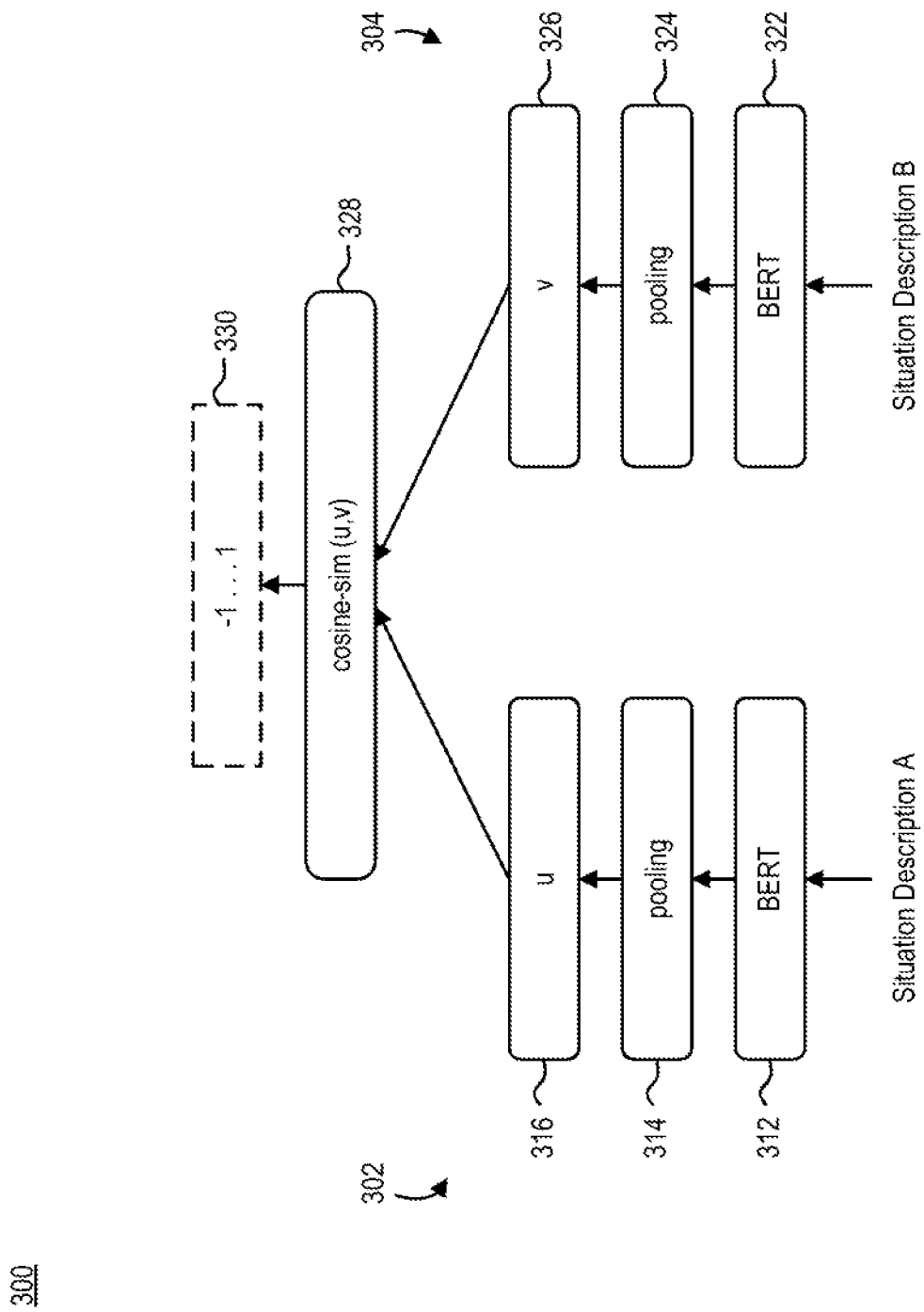
FIG. 3A is a block diagram illustrating an architecture of a machine learning model, according to various embodiments of the present disclosure.

FIG. 3A is a block diagram illustrating exemplary architecture 300 of machine learning model 216, according to one or more embodiments. As described in FIG. 2, machine learning model 216 may be an SBERT model, which is a state-of-the-art NLP model. As shown, architecture 300 is representative of a twin or Siamese network. Such architecture 300 may allow machine learning model 216 to process two inputs simultaneously. Accordingly, architecture 300 may include a first path 302 for a first input and a second path 304 for a second input.

First path 302 includes BERT network 312, a pooling layer 314, and a situation vector 316, $\vec{u}$. A first situation description (e.g., Situation Description A) may be input to a first BERT network 312. BERT network 312 may encode the first situation description and provide the encoded output to pooling layer 314. Pooling layer 314 may be configured to derive a fixed sized sentence embedding from the encoded output. Pooling layer 314 may generate, as output, a situation vector, $\vec{u}$, corresponding to the first situation description.

Second path 304 may be configured similarly to first path 302. As shown, second path 304 includes BERT network 322, a pooling layer 324, and a situation vector 326, $\vec{v}$. A second situation description (e.g., Situation Description B) may be input to a second BERT network 322. BERT network 322 encodes the second situation description and provides the encoded output to pooling layer 324. Pooling layer 324 is configured to derive a fixed sized sentence embedding from the encoded output. Pooling layer 324 may generate, as output, a situation vector 326, $\vec{v}$, corresponding to the second situation description.

Situation vector 316 and situation vector 326 are input to a merge layer 328, in which the cosine similarity of situation vector 316 and situation vector 326 may be computed. The cosine similarity function may indicate the degree of similarity between the first situation vector 316 and the second situation vector 326. As output 330, merge layer 328 may generate a numerical value corresponding to the similarity between first situation vector 316 and second situation vector 326.

Figure 3B:
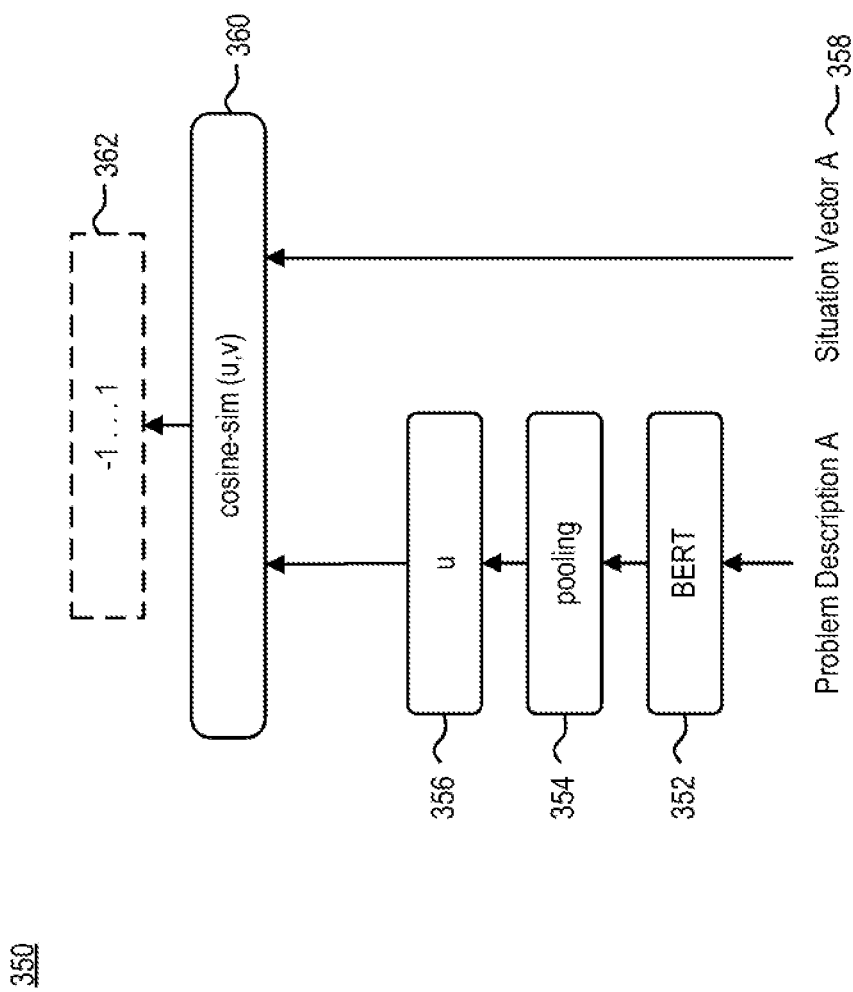
FIG. 3B is a block diagram illustrating an architecture of a machine learning model, according to various embodiments of the present disclosure.

FIG. 3B is a block diagram illustrating exemplary architecture 350 of machine learning model 218, according to one or more embodiments. As described in FIG. 2, machine learning model 216 may be representative of a modified BERT model, which is a state-of-the-art NLP model. Although architecture 350 is not a twin or Siamese network, as discussed above in conjunction with FIG. 3A, architecture 350 may be similar to architecture 300. For example, instead of providing a first input to a first path and a second input to a second path, architecture 350 may, as shown in the illustrated example, allow for an already encoded situation vector (e.g., Situation Vector A) to be input directly to merge layer 360.

As shown, architecture 350 includes BERT network 352, a pooling layer 354, and a situation vector 356, $\vec{u}$. A problem description (e.g., Problem Description A) may be input to a BERT network 352. BERT network 352 encodes the problem description and provides the encoded output to pooling layer 354. Pooling layer 354 is configured to derive a fixed sized sentence embedding from the encoded output. Pooling layer 354 may generate, as output, a situation vector, $\vec{u}$, corresponding to the input problem description.

Situation vector 356 and situation vector 358 are input to a merge layer 360, in which the cosine similarity of situation vector 356 and situation vector 358 may be computed. The cosine similarity function may indicate the degree of similarity between the situation vector 356 and the situation vector 358. As output 362, merge layer 360 may generate a numerical value corresponding to the similarity between first situation vector 356 and second situation vector 358. In this manner, machine learning model 218 may be trained to learn how to generate a situation vector from the extracted problem description.

Figure 4:
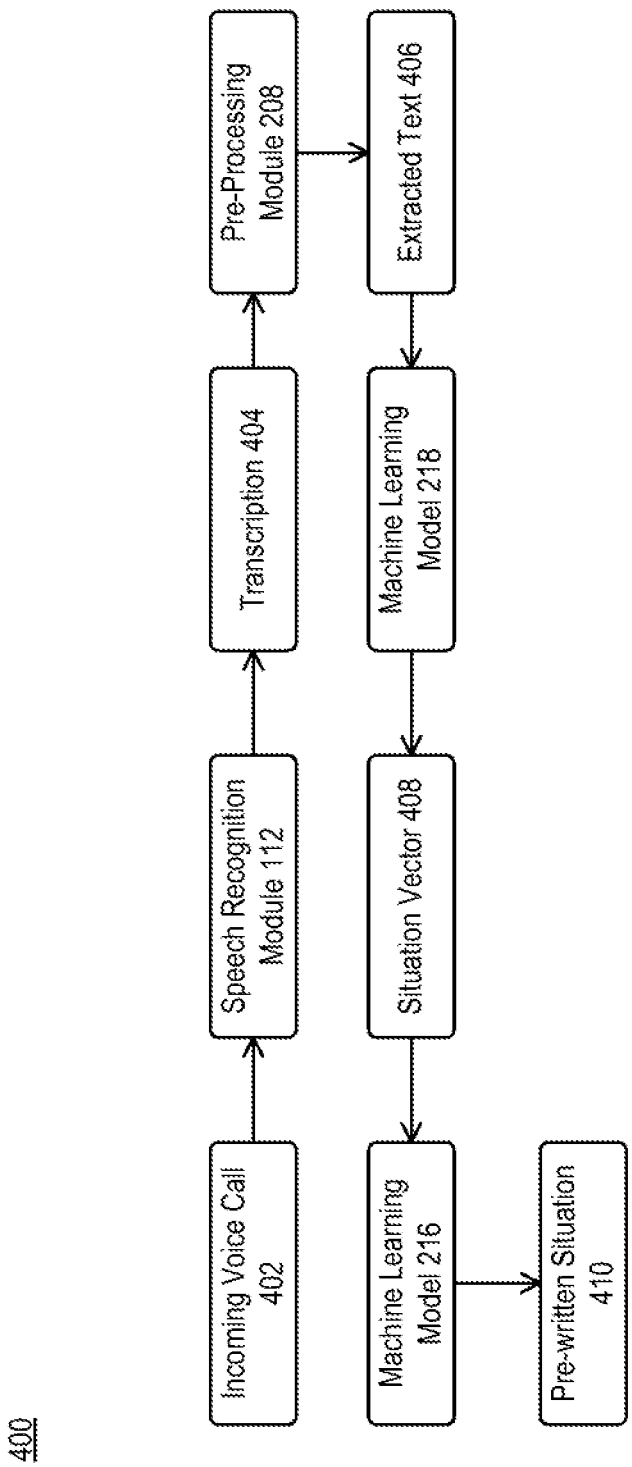
FIG. 4 is a block diagram illustrating an exemplary process flow for automatically generating a situation description for a case note, according to various embodiments of the present disclosure.

FIG. 4 is a block diagram illustrating an exemplary process flow 400 for automatically generating a situation description for a case note, according to one or more embodiments. To begin, an incoming voice call 402 is received. In some embodiments, incoming voice call 402 may be received by agent device 104 from user device 102. Speech recognition module 112 generates a transcription 404 of incoming voice call 402. For example, speech recognition module 112 may utilize one or more NLP techniques to automatically generate a transcription 404 of incoming voice call 402.

Once transcription 404 is generated, pre-processing engine 208 extracts a problem description (e.g., extracted text 406) from transcription 404. Pre-processing engine 208 may apply one or more algorithms to extract the problem description portion from transcription 404. Extracted text 406 may then be provided to machine learning model 218. Machine learning model 218 estimates a situation vector 408 based on extracted text 406. Situation vector 408 is then input to machine learning model 216. Machine learning model 216 may search through the corpus of situation vectors stored in database 214 to identify the closest existing situation vector from database 214. The situation description that corresponds to the fetched situation vector is used as the situation description for the case-note, i.e., pre-written situation 410.

Figure 5:
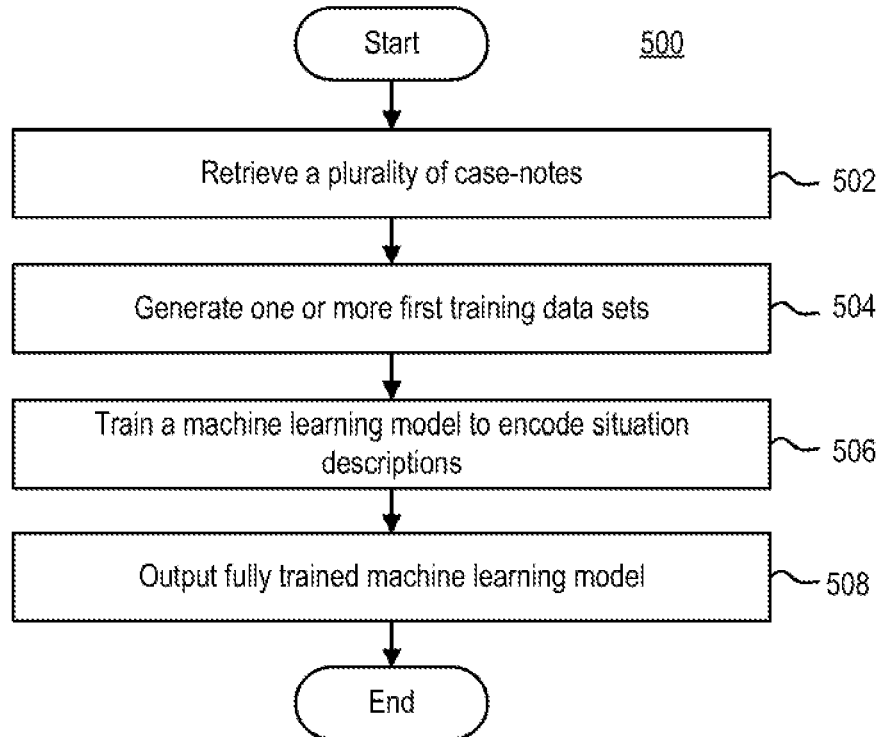
FIG. 5 is a flow diagram illustrating a method of generating a machine learning model, according to various embodiments of the present disclosure.

FIG. 5 is a flow diagram illustrating a method 500 of generating a machine learning model (e.g., machine learning model 216), according to one or more embodiments. Method 500 begins at step 502.

At step 502, back-end computing system 106 retrieves a plurality of case-notes from data store 118. Data store 118 may store previously generated case-notes for customer calls. In some embodiments, pre-processing engine 208 may access previously generated case-notes for customers calls for a specific product (e.g., Quickbooks, TurboTax, Mint, etc.). For example, pre-processing engine 208 may generate a first training data set for product A, a second training data set for product B, and an nth training set for product N. In some embodiments, pre-processing engine 208 may generate one or more first training data sets, generically, without regard to a specific process.

At step 504, back-end computing system 106 generates one or more first training data sets to train machine learning model 216. To generate the one or more first training data sets, pre-processing engine 208 may generate a situation corpus from the extracted case-notes. As described above, each case-note may be stored in the STAR structure. Pre-processing engine 208 may utilize one or more algorithms to extract the situation portions for each case note from each respective STAR structure to generate the situation corpus. In some embodiments, each situation description in the situation corpus may include one or more labels associated therewith. For example, each case-note may be labeled to a category and a subcategory, depending on the user's reason for calling agent device 104.

In some embodiments, pre-processing engine 208 may standardize the situation corpus. To standardize the situation corpus, pre-processing engine 208 may filter the situation corpus to contain situation descriptions that satisfy a specific format. For example, pre-processing engine 208 may identify a subset of situation descriptions that are longer than X characters and shorter than Y characters (e.g., longer than 40 characters and shorter than 100 characters).

In some embodiments, pre-processing engine 208 further filters the situation descriptions to include those situation descriptions that start with the same word or characters. For example, pre-processing engine 208 may further filter the situation descriptions to include those situation descriptions that start with the word "customer" or characters "cx" (i.e., shorthand for customers).

In some embodiments, pre-processing engine 208 further filters the situation descriptions such that the situation descriptions in the training data set have the same or similar meanings. Accordingly, pre-processing engine 208 may be configured to generalize the situation descriptions by replacing references to a specific customer with an appropriate placeholder. For example, pre-processing engine 208 may utilize a name entity recognition algorithm to identify tokens in the situation description that may refer to a customer's name (e.g., "David" or "she") and replace them with a special token (e.g., "CX_NAME").

In this manner, pre-processing engine 208 generates one or more training data sets for machine learning model 216.

At step 506, back-end computing system 106 trains machine learning model 216 based on the one or more training data sets. Training module 210 may train machine learning model 216 to map a situation description to a vector space, such that semantically similar situation descriptions are close. In some embodiments, training module 210 may train machine learning model 216 to generate a vector representation for each situation description in the one or more first training data sets. In this manner, situations that may be similar in nature may result in similar vectors.

To train machine learning model 216, training module 210 may select pairs of situation descriptions from the training data set for input to machine learning model 216. Machine learning model 216 may be trained to encode each situation description into a respective vector representation. Training module 210 may then train machine learning model 216 to compute a similarity score between the two vectors.

Training module 210 may further fine tune machine learning model 216 by carefully selecting pairs of situation descriptions for input to machine learning model 216. For example, training module 210 may leverage the labels of each situation description to form situation description pairs from the same category, but different subcategories. Machine learning model 216 may then compute a similarity score between the vectors. In this manner, training module 210 may increase the accuracy of machine learning model 216 by training machine learning model 216 to differentiate between two very similar situation descriptions.

At step 508, back-end computing system 106 outputs a fully trained machine learning model 216. For example, after training module 210 trains machine learning model 216 to map a situation description to a vector space, such that semantically similar situation descriptions are close, machine learning model 216 may be deployed to identify existing situation descriptions that may be similar to a current situation transcribed from an incoming call.

Figure 6:
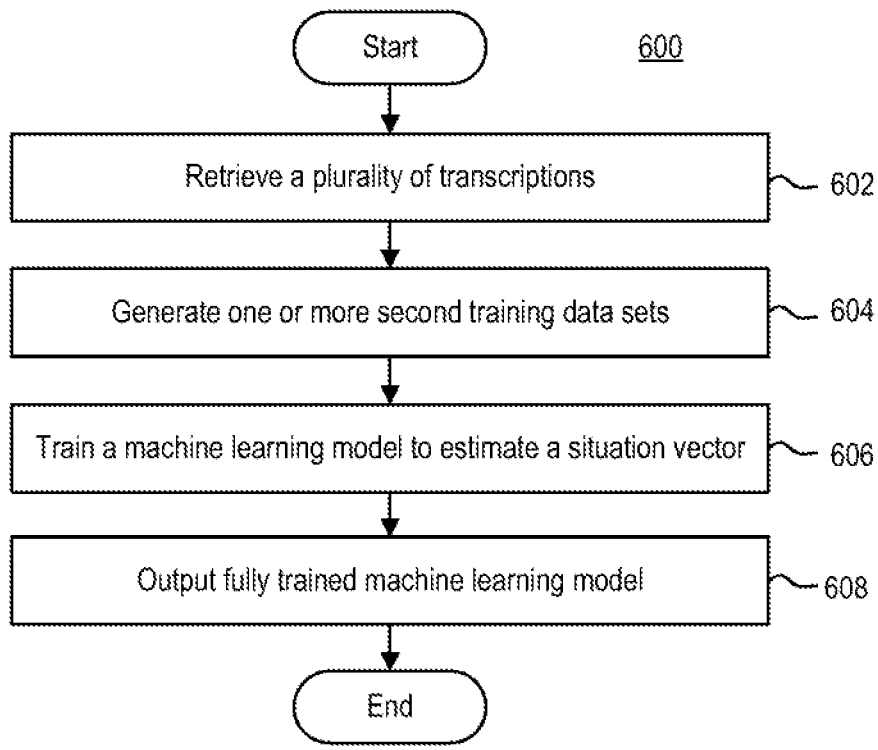
FIG. 6 is a flow diagram illustrating a method of generating a machine learning model, according to various embodiments of the present disclosure.

FIG. 6 is a flow diagram illustrating a method 600 of generating a machine learning model (e.g., machine learning model 218), according to one or more embodiments. Method 600 begins at step 602.

At step 602, back-end computing system 106 retrieves a plurality of transcriptions from data store 118. Data store 118 may store previously generated transcriptions for previously generated case-notes. In some embodiments, pre-processing engine 208 may access previously generated case-notes for customers calls for a specific product (e.g., Quickbooks, TurboTax, Mint, etc.). For example, pre-processing engine 208 may generate a first training data set for product A, a second training data set for product B, and an nth training set for product N.

At step 604, back-end computing system 106 generates one or more training data sets to train machine learning model 218. To generate the one or more first training data sets, pre-processing engine 208 may identify transcripts corresponding to situation vectors that may be generated by machine learning model 216 once fully trained. In this manner, training module 210 may generate a training set that includes a set of situation vectors (as generated by machine learning model 216) and a corresponding set of transcriptions.

For each transcription, pre-processing engine 208 may apply one or more algorithms to extract a problem description portion from each transcription. In this manner, pre-processing engine 208 may generate a problem description corpus for training machine learning model 218.

In some embodiments, pre-processing engine 208 performs one or more pre-processing operations to the problem description corpus. Pre-processing engine 208 may standardize the problem description corpus by filtering the problem description corpus to contain situation descriptions that satisfy a specific format. For example, pre-processing engine 208 may identify a subset of problem descriptions that are longer than X characters and shorter than Y characters (e.g., longer than 40 characters and shorter than 100 characters).

In some embodiments, pre-processing engine 208 further filters the problem description corpus to include those problem descriptions that start with the same word or characters. For example, pre-processing engine 208 may further filter the problem descriptions to include those problem descriptions that start with the word "customer" or characters "cx" (i.e., shorthand for customers).

In some embodiments, pre-processing engine 208 further filters the problem descriptions such that the situation descriptions in the training data set have the same or similar meanings. Accordingly, pre-processing engine 208 may generalize the problem descriptions by replacing references to a specific customer with an appropriate placeholder. For example, pre-processing engine 208 may utilize a name entity recognition algorithm to identify tokens in the problem description that may refer to a customer's name (e.g., "David" or "she") and replace them with a special token (e.g., "CX_NAME").

At step 606, back-end computing system 106 trains machine learning model 218 based on the one or more training data sets. Training module 210 may use the problem description training data set to train machine learning model 218 to generate a situation vector based on the problem description. In some embodiments, training module 210 may train machine learning model 216 to generate a vector representation for each problem description in the training data set.

In some embodiments, machine learning model 218 is representative of a modified BERT model. To train machine learning model 218, training module 210 may select problem description from the problem description training data set and a corresponding situation vector for input to machine learning model 216. Machine learning model 216 may be trained to encode each problem description into a respective vector representation. Training module 210 then trains machine learning model 216 to compute a similarity score between the problem description vector and the associated situation vector. If this similarity score is close (e.g., 1), then machine learning model 216 generated a vector that is closely similar to the corresponding situation vector. In this manner, machine learning model 218 may be trained to generate the situation vector directly from the transcription, thus eliminating any manual process to be performed by the agent.

At step 608, back-end computing system 106 outputs a fully trained machine learning model 218. For example, after training module 210 trains machine learning model 216 to estimate a situation vector based on a problem description, machine learning model 216 may be deployed to automatically estimate a situation vector for an incoming call based on the transcription of the incoming call.

Figure 7:
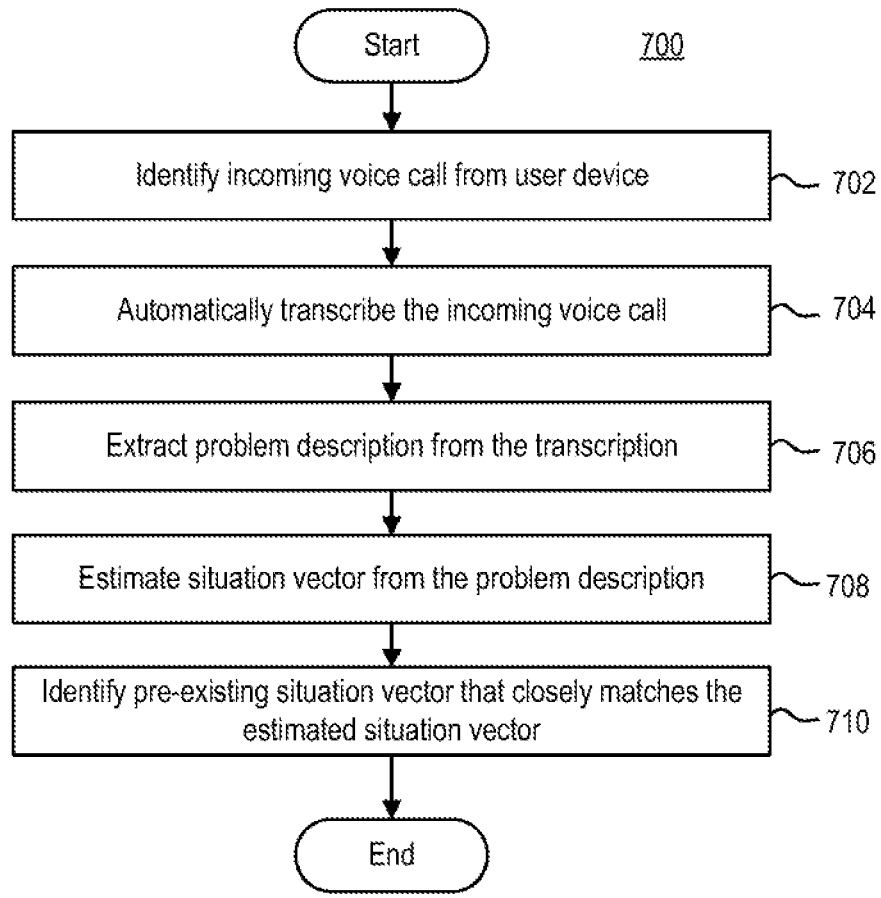
FIG. 7 is a flow diagram illustrating a method of automatically generating a situation description for a target customer call, according to various embodiments of the present disclosure.

FIG. 7 is a flow diagram illustrating a method 700 of automatically generating a situation description for a target customer call, according to example embodiments. Method 700 begins at step 702.

At step 702, back-end computing system 106 identifies an incoming voice call from user device 102. For example, agent device 104 may receive an incoming voice call from user device 102. Via application 110 executing on agent device 104, back-end computing system 106 may be notified that a dialogue has been established between user device 102 and agent device 104. In response to the notification, back-end computing system 106 may being recording the conversation between a user of user device 102 and an agent of agent device 104.

At step 704, back-end computing system 106 automatically transcribes the incoming voice call. In some embodiments, speech recognition module 112 may automatically transcribe the incoming voice call using one or more natural language processing techniques. In some embodiments, API module 116 may leverage a third party service to automatically transcribe the incoming call. For example, API module 116 may call an external service to transcribe the incoming call.

At step 706, back-end computing system 106 extracts a problem description from the transcription. For example, pre-processing engine 208 may apply one or more algorithms to extract a problem description portion from the generated transcription.

At step 708, back-end computing system 106 estimates a situation vector from the problem description. To estimate the problem description, customer support system 114 may input the situation vector into machine learning model 218. Machine learning model 218 may encode the problem description to generate the situation vector representation.

At step 710, back-end computing system 106 identifies a pre-existing situation vector that closely matches the estimated situation vector. To identify the pre-existing situation vector, customer support system 114 may utilize machine learning model 216 to compare one or more pre-existing situation vectors stored in data store 118 to the estimated situation vector. In some embodiments, the comparison includes generating the cosine similarity between each stored situation vector and the estimated situation vector. Customer support system 114 may select the pre-existing situation vector with the best cosine similarity score. In this manner, customer support system 114 may retrieve the situation description that corresponds to the pre-existing situation vector that has the best cosine similarity score. Customer support system 114 may use this situation description as the situation description for the incoming call.

Figure 8:
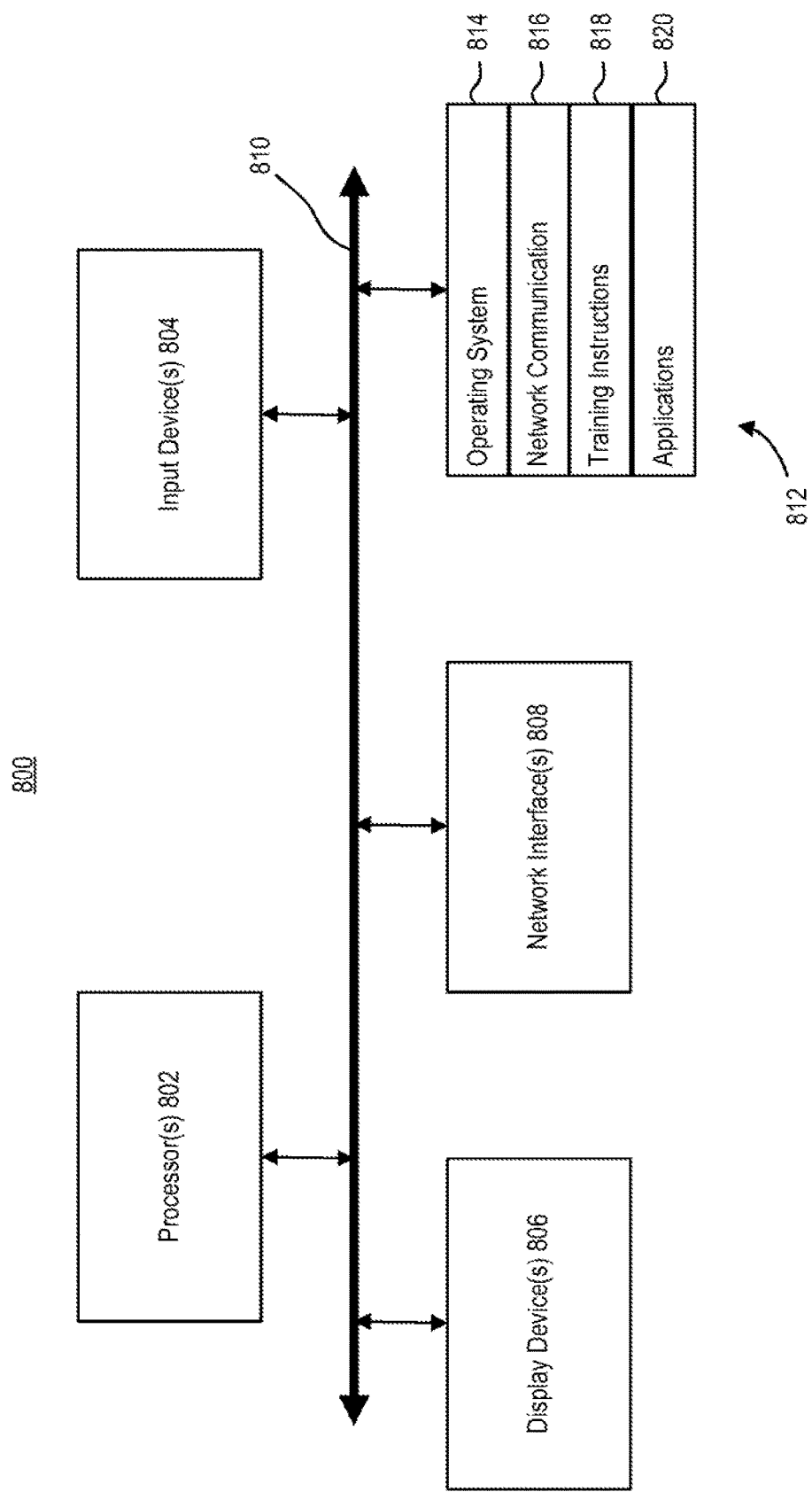
FIG. 8 is a block diagram illustrating an example computing device, according to various embodiments of the present disclosure.

FIG. 8 shows an example computing device according to an embodiment of the present disclosure. For example, computing device 800 may function as back-end computing system 106. The computing device 800 may include a customer support system that executes the situation description generation process described above or a portion or combination thereof in some embodiments. The computing device 800 may be implemented on any electronic device that runs software applications derived from compiled instructions, including without limitation personal computers, servers, smart phones, media players, electronic tablets, game consoles, email devices, etc. In some implementations, the computing device 800 may include one or more processors 802, one or more input devices 804, one or more display devices 806, one or more network interfaces 808, and one or more computer-readable mediums 812. Each of these components may be coupled by bus 810, and in some embodiments, these components may be distributed among multiple physical locations and coupled by a network.

Display device 806 may be any known display technology, including but not limited to display devices using Liquid Crystal Display (LCD) or Light Emitting Diode (LED) technology. Processor(s) 802 may use any known processor technology, including but not limited to graphics processors and multi-core processors. Input device 804 may be any known input device technology, including but not limited to a keyboard (including a virtual keyboard), mouse, track ball, camera, and touch-sensitive pad or display. Bus 810 may be any known internal or external bus technology, including but not limited to ISA, EISA, PCI, PCI Express, USB, Serial ATA or FireWire. Computer-readable medium 812 may be any non-transitory medium that participates in providing instructions to processor(s) 802 for execution, including without limitation, non-volatile storage media (e.g., optical disks, magnetic disks, flash drives, etc.), or volatile media (e.g., SDRAM, ROM, etc.).

Computer-readable medium 812 may include various instructions for implementing an operating system 814 (e.g., Mac OS®, Windows®, Linux). The operating system may be multi-user, multiprocessing, multitasking, multithreading, real-time, and the like. The operating system may perform basic tasks, including but not limited to: recognizing input from input device 804; sending output to display device 806; keeping track of files and directories on computer-readable medium 812; controlling peripheral devices (e.g., disk drives, printers, etc.) which can be controlled directly or through an I/O controller; and managing traffic on bus 810. Network communications instructions 816 may establish and maintain network connections (e.g., software for implementing communication protocols, such as TCP/IP, HTTP, Ethernet, telephony, etc.).

Training instructions 818 may include instructions that enable computing device 800 to function as customer support system and/or to train one or more machine learning models to work in conjunction to automatically generation a situation description for a customer call. Application(s) 820 may be an application that uses or implements the processes described herein and/or other processes. The processes may also be implemented in operating system 814.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a computing system comprising:
   extracting a problem description from text;
   estimating a situation vector from the problem description;
   identifying, by a machine learning model, a pre-existing situation vector that closely matches the estimated situation vector, the machine learning model being trained by:
      generating a training data set comprising a plurality of standardized situation descriptions extracted from pre-existing case notes and filtering the standardized situation descriptions to include a subset of situation descriptions that start with a same set of characters, and
      learning, by the machine learning model, to map each standardized situation description to a vector space, semantically similar situation descriptions being closely mapped in the vector space; and
   retrieving a situation description that corresponds to the identified pre-existing situation vector.

2. The method of claim 1, wherein generating the training data set comprising the plurality of standardized situation descriptions comprises:
   standardizing each situation description by identifying a subset of situation descriptions that include the minimum amount of characters.

3. The method of claim 1, wherein generating the training data set comprising the plurality of standardized situation descriptions comprises:
   anonymizing each standardized situation description by replacing identifying information with a special token.

4. The method of claim 1, wherein identifying, by the machine learning model, the pre-existing situation vector that closely matches the estimated situation vector comprises:
   accessing a database comprising a plurality of pre-existing situation vectors; and
   generating a cosine similarity between each pre-existing situation vector and the estimated situation vector.

5. The method of claim 1, the estimating the situation vector being performed by a second machine learning model, the method further comprising:
   training the second machine learning model by:
      generating a training data set comprising a plurality of pre-existing texts from a data store and a plurality of situation vectors, each situation vector corresponding to a respective pre-existing text; and
      learning, by the second machine learning model, to estimate a situation vector for respective pre-existing text based on the training data set.

6. A non-transitory computer readable medium having one or more sequences of instructions, which, when executed by a processor, causes a computing system to perform operations comprising:
   extracting, by the computing system, a problem description from text;
   estimating, by the computing system, a situation vector from the problem description;
   identifying, by a machine learning model of the computing system, a pre-existing situation vector that closely matches the estimated situation vector, the machine learning model being trained by:
      generating a training data set comprising a plurality of standardized situation descriptions extracted from pre-existing case notes and filtering the standardized situation descriptions to include a subset of situation descriptions that start with a same set of characters, and
      learning, by the machine learning model, to map each standardized situation description to a vector space, semantically similar situation descriptions being closely mapped in the vector space; and
   retrieving, by the computing system, a situation description that corresponds to the identified pre-existing situation vector.

7. The non-transitory computer readable medium of claim 6, wherein generating the training data set comprising the plurality of standardized situation descriptions comprises:
   standardizing each situation description by identifying a subset of situation descriptions that include the minimum amount of characters.

8. The non-transitory computer readable medium of claim 6, wherein generating the training data set comprising the plurality of standardized situation descriptions comprises:
   anonymizing each standardized situation description by replacing identifying information with a special token.

9. The non-transitory computer readable medium of claim 6, wherein identifying, by the machine learning model of the computing system, the pre-existing situation vector that closely matches the estimated situation vector comprises:
   accessing a database comprising a plurality of pre-existing situation vectors; and
   generating a cosine similarity between each pre-existing situation vector and the estimated situation vector.

10. The non-transitory computer readable medium of claim 6, the estimating the situation vector being performed by a second machine learning model, the operations further comprising:
    training, by the computing system, the second machine learning model by:
       generating a training data set comprising a plurality of pre-existing texts from a data store and a plurality of situation vectors, each situation vector corresponding to a respective pre-existing text; and
       learning, by the second machine learning model, to estimate a situation vector for a respective pre-existing text based on the training data set.

11. A system comprising:
    a processor; and
    a memory having one or more instructions stored thereon, which, when executed by the processor, causes the system to perform operations comprising:
       extracting a problem description from text;
       estimating a situation vector from the problem description;
       identifying, by a machine learning model of the system, a pre-existing situation vector that closely matches the estimated situation vector, the machine learning model being trained by:
          generating a training data set comprising a plurality of standardized situation descriptions extracted from pre-existing case notes and filtering the standardized situation descriptions to include a subset of situation descriptions that start with a same set of characters, and learning, by the machine learning model, to map each standardized situation description to a vector space, semantically similar situation descriptions being closely mapped in the vector space; and retrieving a situation description that corresponds to the identified pre-existing situation vector.

12. The system of claim 11, wherein generating the training data set comprising the plurality of standardized situation descriptions comprises:

standardizing each situation description by identifying a subset of situation descriptions that include the minimum amount of characters.

13. The system of claim 11, wherein generating the training data set comprising the plurality of standardized situation descriptions comprises:

filtering the standardized situation descriptions to include a subset of situation descriptions that start with a same set of characters.

14. The system of claim 11, wherein identifying, by the machine learning model of the system, the pre-existing situation vector that closely matches the estimated situation vector comprises:

accessing a database comprising a plurality of pre-existing situation vectors; and generating a cosine similarity between each pre-existing situation vector and the estimated situation vector.

15. The system of claim 11, the estimating the situation vector being performed by a second machine learning model, the operations further comprising:

training the second machine learning model by:
generating a training data set comprising a plurality of pre-existing texts from a data store and a plurality of situation vectors, each situation vector corresponding to a respective pre-existing text; and learning, by the second machine learning model, to estimate a situation vector for a respective pre-existing text based on the training data set.

* * * * *